No. 786,261. PATENTED APR. 4, 1905.
F. BRICHTA.
MACHINE FOR MAKING ARTIFICIAL STONE.
APPLICATION FILED JULY 19, 1904.
3 SHEETS—SHEET 1.
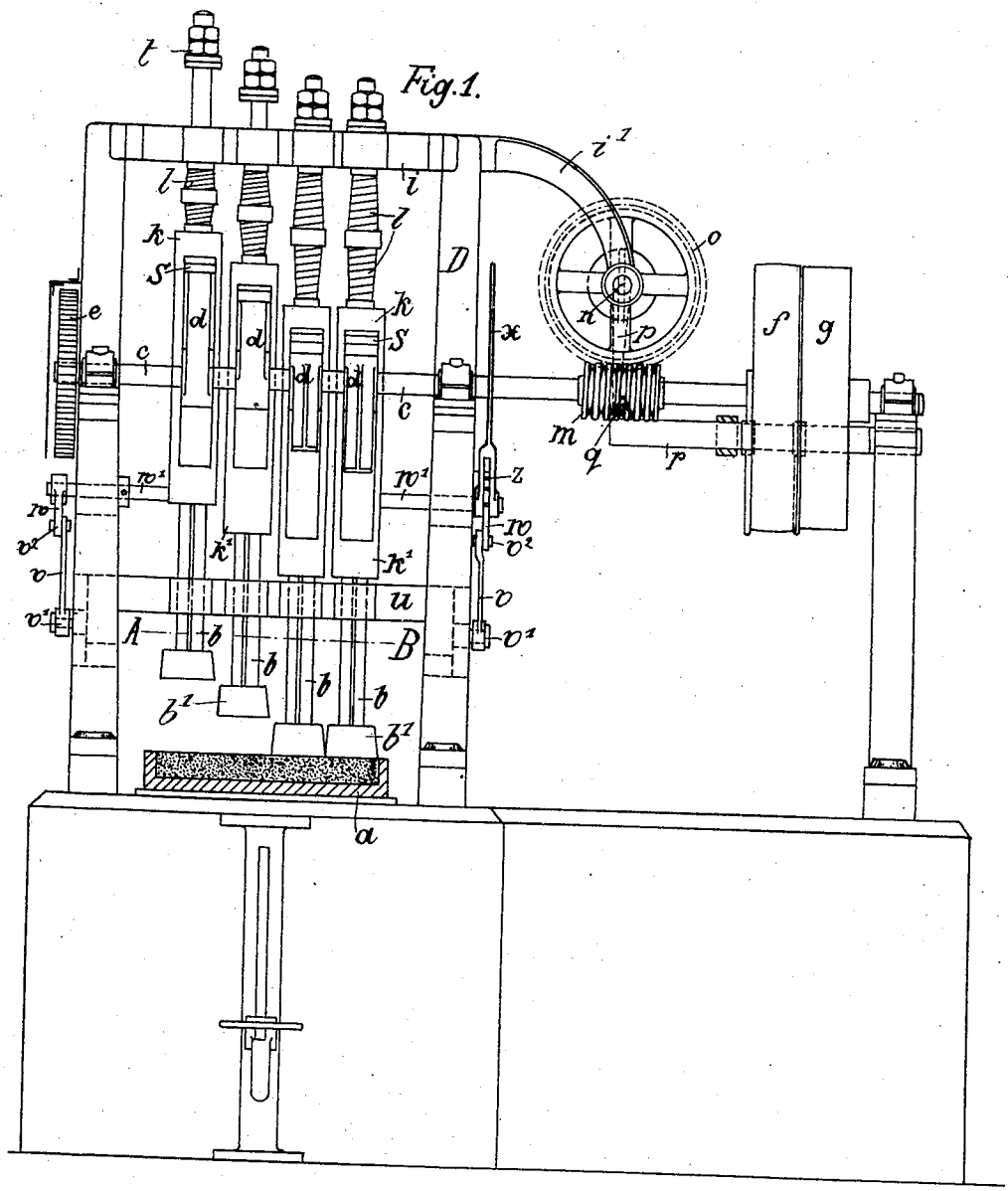
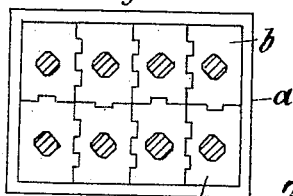
Witnesses:
Inventor:
Florentius Brichta
by Frank v. Briesen Atty.

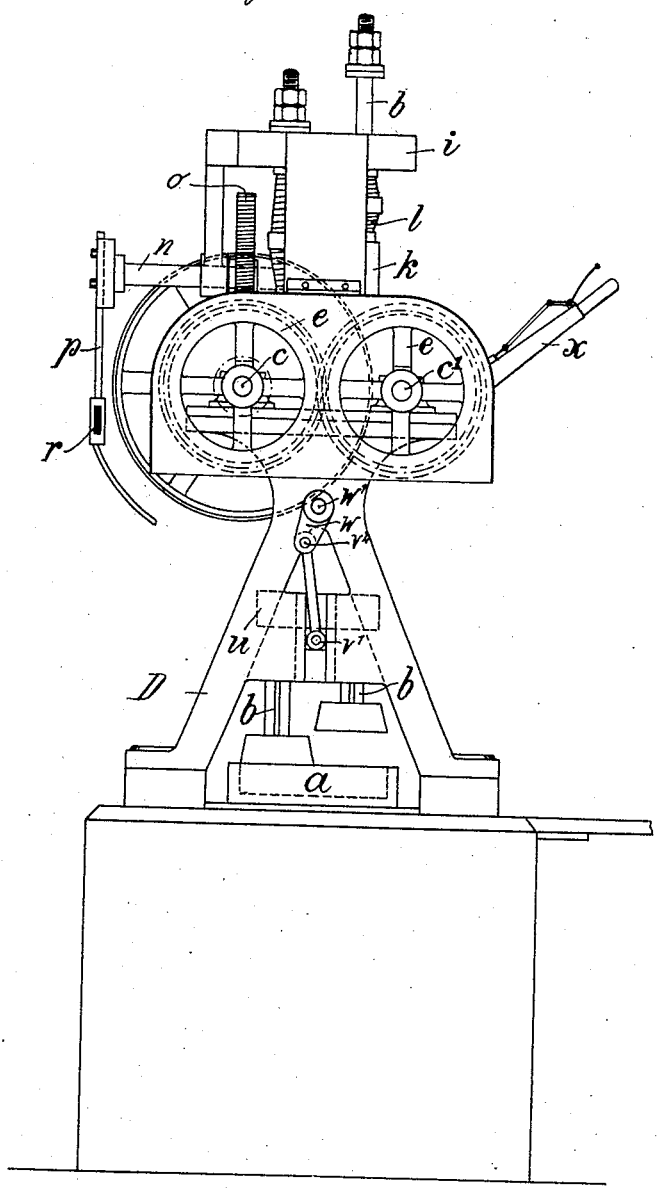

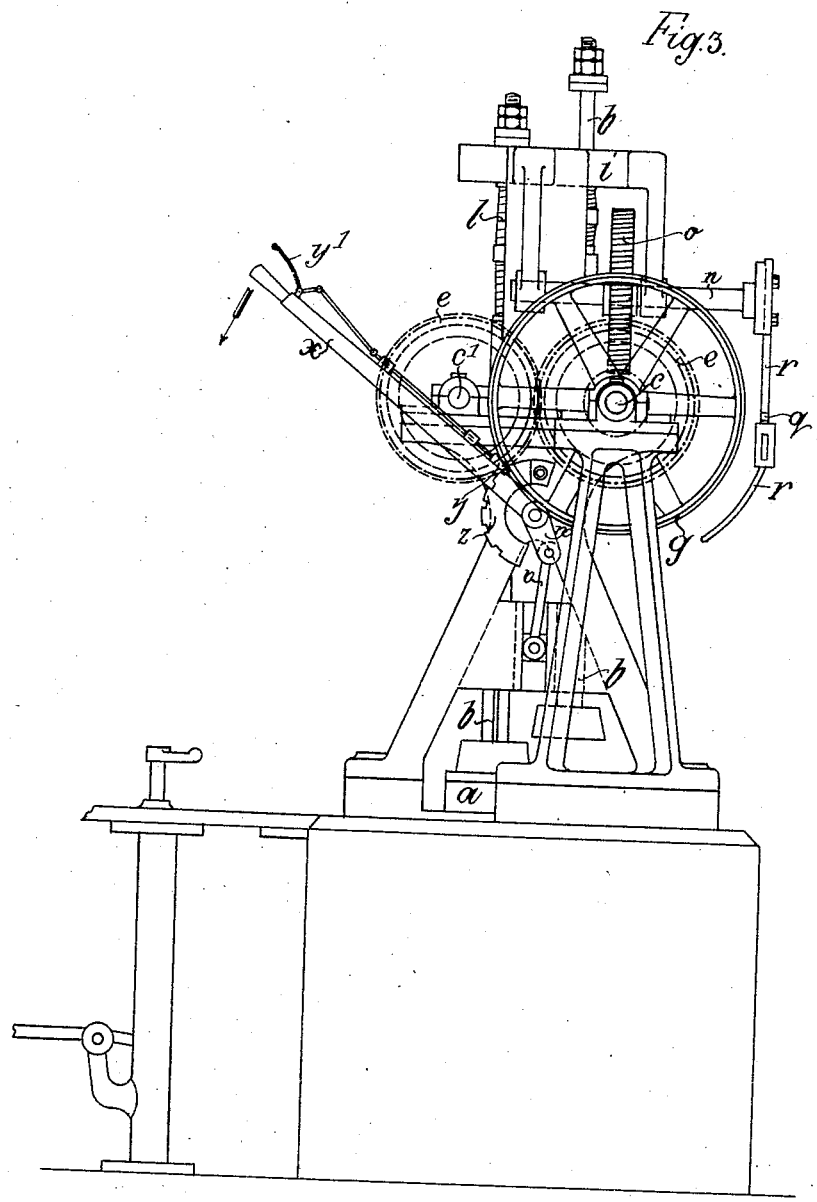

No. 786,261. Patented April 4, 1905.

UNITED STATES PATENT OFFICE.

FLORENTIUS BRICHTA, OF HOLZMINDEN, GERMANY.

MACHINE FOR MAKING ARTIFICIAL STONE.

SPECIFICATION forming part of Letters Patent No. 786,261, dated April 4, 1905.

Application filed July 19, 1904. Serial No. 217,177.

*To all whom it may concern:*

Be it known that I, FLORENTIUS BRICHTA, a citizen of Germany, residing at Holzminden, Germany, have invented new and useful Improvements in Machines for Making Artificial Stone, of which the following is a specification.

This invention relates to a machine for making artificial stone which is so constructed that the particles of plastic mass may shift laterally while being tamped, so that any excess of material at any one point will make up for a deficiency of material at another point. In this way a product of uniform consistency will be obtained.

In the accompanying drawings, Figure 1 is a front elevation of my improved machine for making artificial stone; Fig. 2, a left-hand side view thereof; Fig. 3, a right-hand side view; and Fig. 4, a horizontal section through the plungers on line A B, Fig. 1.

The letter $a$ represents a mold, and $b$ represents a plurality of plungers working side by side and collectively of a size corresponding to that of the mold. The drawings show eight plungers arranged in two rows. To actuate the plungers, there are journaled in the machine-frame D a pair of parallel shafts $c\ c'$, provided with fingers or lifters $d$, that engage noses $k$ of plungers $b$. These lifters are mounted at different angles, so that the plungers $b$ will descend successively one after the other. Springs $l$, bearing with one end against a cross-piece $i$ of frame D and with the other end against the plungers, assist to increase the force of the downstroke of the latter. The springs also serve to effect a uniform and even running of the machine. The shafts $c\ c'$ are intergeared by toothed wheels $e$, the shaft $c$ carrying a driving-pulley $f$ and a loose pulley $g$. The shaft $c$ is further provided with a worm $m$, engaging a worm-wheel $o$, fast on a shaft $n$, which is journaled in arms $i'$ of frame D. The shaft $n$ carries a lever $p$, adapted to engage a projection $q$ of a belt-shifter $r$ at each complete rotation of wheel $o$.

In order to regulate the stroke of the plungers, their upper threaded ends are encircled by adjusting-nuts $t$, adapted to contact with cross-piece $i$. By properly setting these nuts stones of different thickness may be molded.

To permit the introduction and removal of the mold, it is necessary that the plungers $b$ may be sustained in their elevated position. To this effect the plungers pass through a perforated slidable rail $u$, to the ends of which are pivoted at $v'$ the links $v$. To these links are pivoted at $v^2$ the cranks $w$ of a rock-shaft $w'$, which may be oscillated in its bearings by hand-lever $x$. If the lever is depressed, as indicated by the arrow, Fig. 3, the rail $u$ will be raised to engage offsets $k'$ of plungers $b$, and thus elevate the plungers against the action of springs $l$. The rail may be locked in its raised position by a detent $y$, connected to an auxiliary lever $y'$ and engaging a toothed segment $z$.

The heads $b'$ of plungers $b$ are provided at their contiguous sides with tongues and corresponding grooves, Fig. 4, so that a zigzag line is formed at the junction of the plungers. By this construction cracking of the stone on lines corresponding to the joints between the plungers is prevented.

In use the shafts $c\ c'$ are rotated so that the plungers are successively raised by fingers $d$ against the action of springs $l$. When any one finger clears the nose $k$ of its plunger, the latter will descend to tamp the concrete mass directly beneath the same. In this way the plungers will be caused to descend successively and to compress the plastic mass in corresponding successive sections in contradistinction to the action of a single plunger which simultaneously compresses the entire surface of the mass. If an excess of material is encountered by a plunger, such excess will be crowded laterally into the path of one of the adjoining plungers, so that a uniform product possessing increased density and strength is obtained. After the shaft $c$ has made a complete rotation lever $p$ will by engaging projection $q$ move belt-shifter $r$ to throw the belt upon loose pulley $g$ and arrest the machine. If desired, the lever $p$ can be made adjustable, or the worm-wheel may be made interchangeable to regulate the period during which each charge is being tamped. The plungers or the mold may also be made laterally movable to tamp stones of larger areas. In lieu of using a plurality of plungers a single plunger which is laterally adjustable may be employed, or I may use a single plunger within an adjustable mold.

What I claim is—

A machine for making artificial stone composed of a mold, a shaft, a series of fingers mounted thereon at different angles, plungers adapted to be engaged by the fingers, a slidable rail adapted to engage the plungers, and means for locking the rail in its raised position, substantially as specified.

Signed by me at Leipzig this 2d day of July, 1904.

FLORENTIUS BRICHTA.

Witnesses:
RUDOLPH FRICKE,
LEON ZEITLIN.